Oct. 15, 1935.                T. L. ADAMS                2,017,577
DIFFERENTIAL GEAR FOR AUTOMOTIVE VEHICLES
Filed Nov. 1, 1934
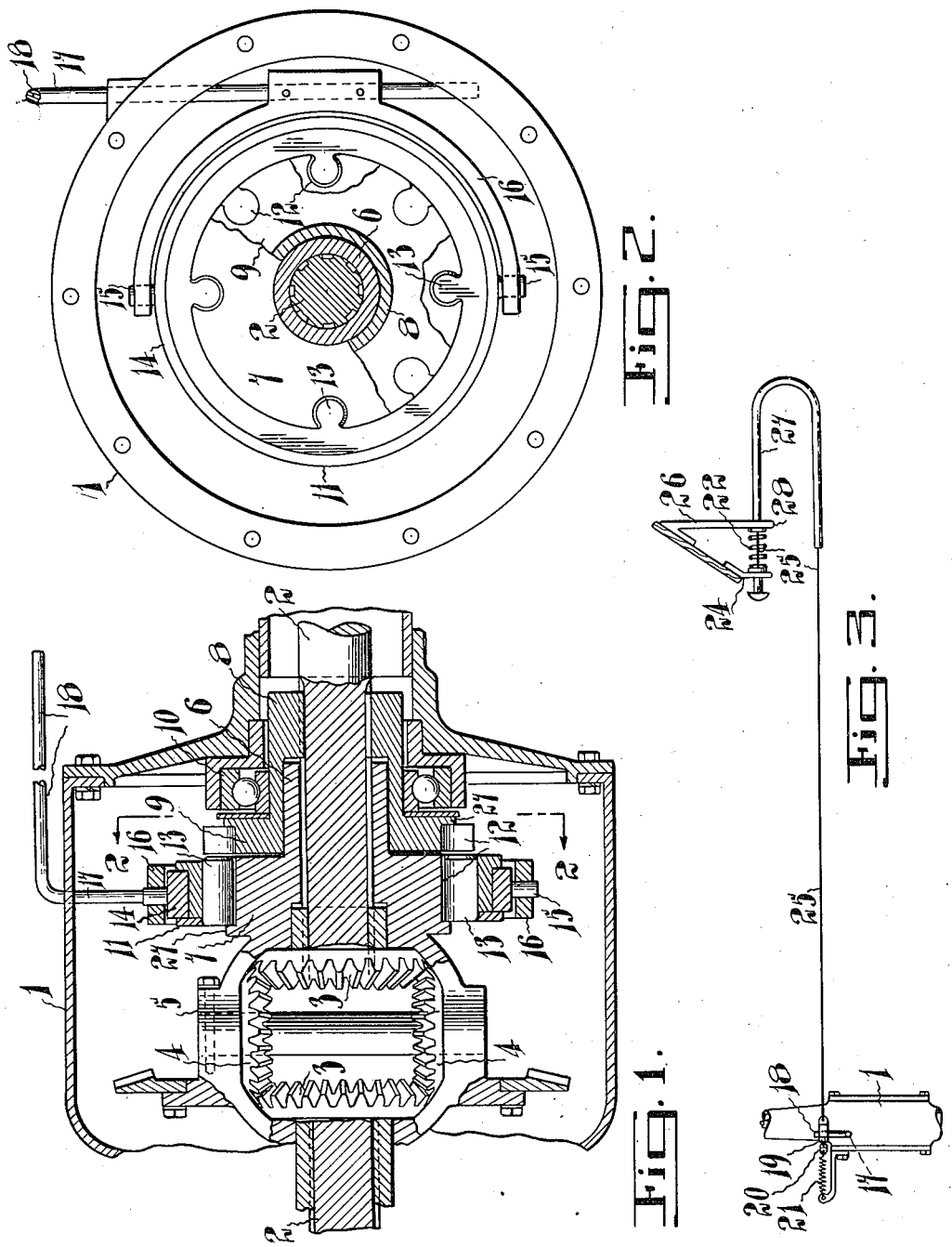
Inventor
T. L. Adams
by J. Edw. Maybee
ATTY.

Patented Oct. 15, 1935

2,017,577

UNITED STATES PATENT OFFICE 2,017,577

DIFFERENTIAL GEAR FOR AUTOMOTIVE VEHICLES

Tredgert Lee Adams, Owen Sound, Ontario, Canada

Application November 1, 1934, Serial No. 750,949

4 Claims. (Cl. 74—316)

This invention relates to the gearing commonly provided on motor vehicles to permit of different rates of rotation of the driven wheels. It is a commonly noted weakness of such gears that there is loss of tractive effect if one wheel has less frictional grip on the road surface than the other and that the tractive effect may vanish completely if one wheel is in contact with a slippery surface while the other has a more or less effective grip.

My object therefore is to provide means whereby the differential gearing may be so locked, when desired, that both wheels will rotate together as if they were both rigidly secured to a common axle.

A further object is to so arrange the locking means and its control that, while the locking is effected by the action of an operator, the release is effected automatically as soon as the need for locking is past.

I attain my object by means of a construction which may be briefly described as follows.

The differential gear to which the lock is applied is of ordinary type and is provided with two alined axles, opposed differential gears secured thereon, a differential pinion meshing with the said gears, and a rotatable differential case or frame in which the differential pinion is journalled. A clutch member comprising a disk having a notched periphery is secured to or formed on the differential case and a similar clutch disk is secured to one of the axles. A clutch member is slidable on one of the said disks to and from a position to engage in the said notches and lock the disks together. A spring is provided tending to move the clutch member to its engaged position. A second spring is provided which normally overcomes the pull of the first mentioned spring and holds the clutch in its disengaged position.

A manual control is provided whereby, at will, the action of the second spring may be negatived and the first spring allowed to move the clutch to effect the locking. After locking, if the manual control be released the stronger spring comes into action, but the friction on the clutch member will hold the differential locked as long as the resistance of the axles to turning remains unequal.

The invention is hereinafter more specifically described and is illustrated in the accompanying drawing in which—

Fig. 1 is a longitudinal section of part of a differential gear provided with my locking means;

Fig. 2 a cross section on the line 2—2 in Fig. 1; and

Fig. 3 a diagrammatical plan illustrating the control means.

In the drawing I illustrate such parts only of the differential of an automotive vehicle which are necessary to the proper understanding of the invention.

Referring to the drawing, 1 is the differential and rear axle housing which as usual is a stationary part. Within this housing are positioned the alined axles 2 to which are secured the differential gears 3, which mesh with the differential pinion 4 which is journalled on the differential case 5. This case at one side may be journalled in the housing 1 in any ordinary manner. At the other side it is shown as provided with a sleeve 6 loose on the axle 2. Formed on or secured to the differential case is a disk 7. Sleeved on the sleeve 6 is a sleeve 8 which at its outer end fits on and is keyed to the axle 2. This sleeve has formed on or secured thereto the disk 9.

The sleeve 8 is journalled in the differential housing 1 by means of the bearings 10.

It is evident that, if the disks 7 and 9 be locked together, the differential case will be locked to the axle carrying the disk 9 and that both the axles 2 will of necessity rotate as a unit.

Any suitable clutch may be provided for thus locking the disks together. I show for this purpose a movable clutch member 11 which is slidable axially of but is non-rotatable relative to one of the disks and is adapted to be moved to a clutching engagement with the other disk. The movements of this clutch member in either direction are limited by annular shoulders 27 formed on the disks 7 and 9.

A convenient arrangement is to form in the periphery of each disk a series of transverse notches 12.

The clutch member 11 is ring-shaped and is provided with projections 13 adapted to fit either set of notches. Normally this clutch member is engaged only with the disk 7 which is wider than the disk 9 but, when moved axially, may be engaged with both disks to form a driving connection between them.

The clutch member is formed with a peripheral groove in which fits a shifter ring 14 provided with the trunnions 15 which are journalled in the ends of the yoke lever 16. This yoke lever is secured to the crank shaft 17 journalled on the housing 1 and provided outside the housing with the crank arm 18. It is evident that by rocking the crank arm the clutch may be operated to lock or unlock the gear as desired.

The following means are provided for actuating the crank arm 18.

A connection 19 is slidable on the crank arm 18 and may be locked as moved by the set screw 20.

A coil spring 21 is secured at one end to the housing 1 or other stationary part and at its other end to the connection 19, preferably by being hooked into a hole in the set screw 20.

This spring tends to rock the crank arm to lock the gear, but normally this action is prevented by a stronger spring 22 preferably arranged as follows.

In a suitable place convenient to the driver of the vehicle is positioned a push button slidable in a stationary guide 24. To this button is secured one end of a stout wire 25, the other end of which is secured to the connection 19. To bring the button to a convenient position for operation the wire may be run through a stationary guide tube 27. The spring 22 bears against the button and a stationary part 26 and normally maintains the wire 25 taut and the spring 21 extended, thus holding the clutch of the gear lock disengaged. If however, the wire is slackened by pushing in the button against the pressure of the spring 22, the spring 21 is left free to rock the arm 18 and engage the clutch.

As soon as the button is released the spring 22 comes into action again but will not usually be able to retract the clutch as long as the conditions continue which rendered desirable the locking of the differential gear, since such conditions create a friction in the clutch which aids the spring 21 to overcome the action of the spring 22.

From the above description it will be seen that I have devised simple and inexpensive means which will enable the driver of an automotive vehicle to obtain the advantage of a solid axle drive by simply pressing a button and that, without further action on his part, the solid axle conditions continue as long as the conditions demand, after that the return to normal differential being automatic.

This present invention is an improvement on the subject matter of application Serial No. 731,774 filed June 21, 1934.

What I claim as my invention is:

1. The combination with a differential gear including alined axles and a rotatable differential case of a positive clutch whereby one of the axles may be locked to the differential case; and clutch operating mechanism including a spring tending to move the clutch to the locking position, a stronger spring normally neutralizing the first mentioned spring and manually operable means for inhibiting the effect of the said stronger spring.

2. The combination with a differential gear including alined axles and a rotatable differential case of a positive clutch whereby one of the axles may be locked to the differential case; and clutch operating mechanism including a crank shaft formed with a crank arm, a spring connected to a stationary part and the crank arm tending to move the clutch to the locking position, a wire connected to the rock arm adapted when sufficiently tensioned to rock the said arm to disengage the clutch, a spring engaging the wire and a stationary part adapted to apply sufficient tension to the wire to disengage the clutch against the action of the first mentioned spring, the wire being provided with means whereby it may be manually moved against the pressure of the second mentioned spring.

3. The combination with a differential gear including alined axles and a rotatable differential case of a positive clutch whereby one of the axles may be locked to the differential case; and clutch operating mechanism including a spring tending to move the clutch to the locking position, a stronger spring normally neutralizing the first mentioned spring and manually operable means for inhibiting the effect of the said stronger spring, and means for varying the degree of overbalance of the one spring over the other.

4. The combination with a differential gear including alined axles and a rotatable differential case of a positive clutch whereby one of the axles may be locked to the differential case; and clutch operating mechanism including a crank shaft formed with a crank arm, a spring connected to a stationary part and the crank arm tending to move the clutch to the locking position, a wire connected to the rock arm adapted when sufficiently tensioned to rock the said arm to disengage the clutch, a spring engaging the wire and a stationary part adapted to apply sufficient tension to the wire to disengage the clutch against the action of the first mentioned spring, the wire being provided with means whereby it may be manually moved against the pressure of the second mentioned spring, and means for varying the degree of overbalance of the one spring over the other.

TREDGERT LEE ADAMS.